Feb. 27, 1945.  A. J. HUCK  2,370,404
TEMPERATURE RESPONSIVE CONTROL MECHANISM
Filed Nov. 10, 1941  3 Sheets-Sheet 2
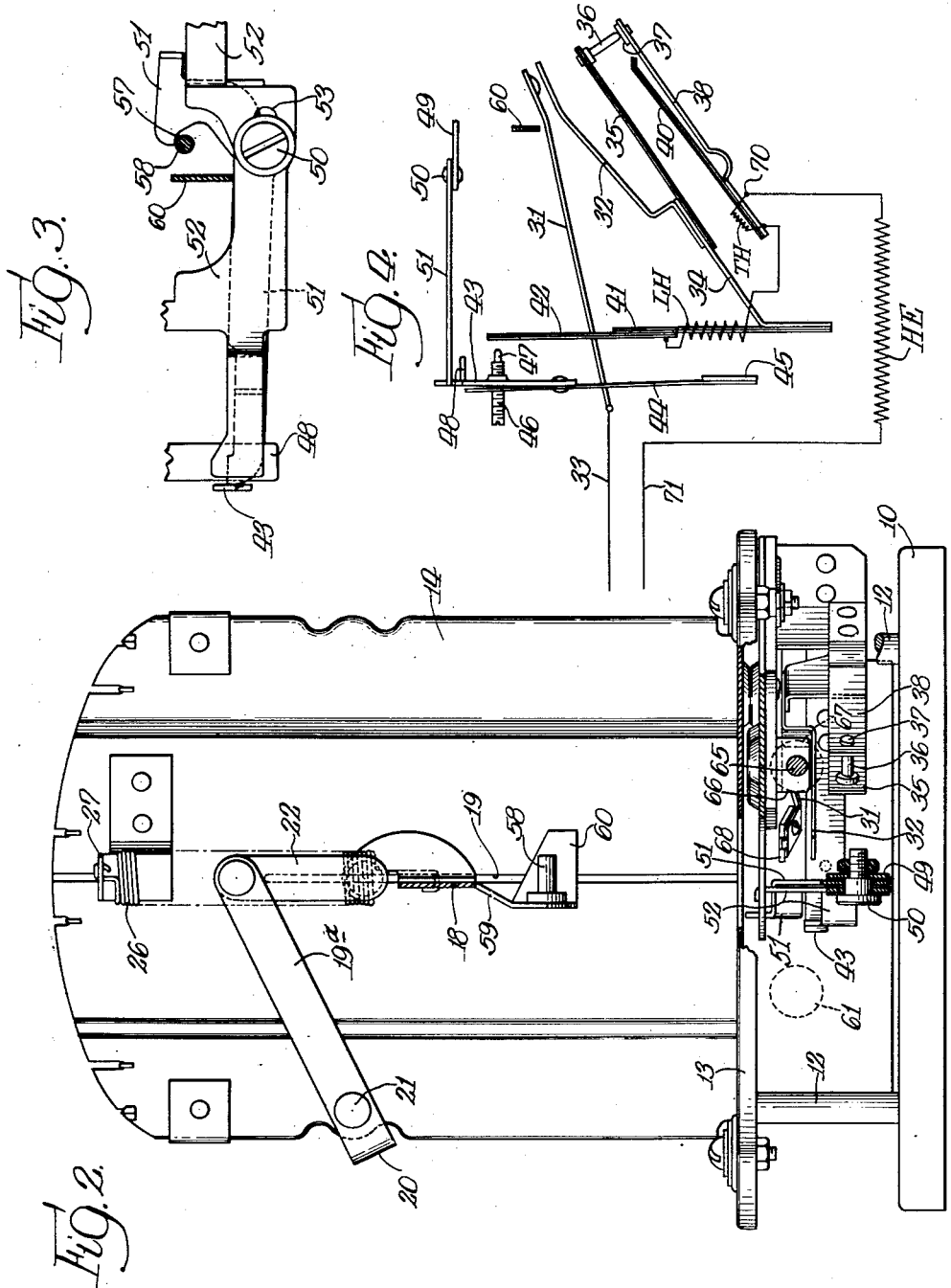
INVENTOR.
Alfred J. Huck,
BY Bair & Freeman
Attys Feb. 27, 1945.   A. J. HUCK   2,370,404
TEMPERATURE RESPONSIVE CONTROL MECHANISM
Filed Nov. 10, 1941   3 Sheets-Sheet 3
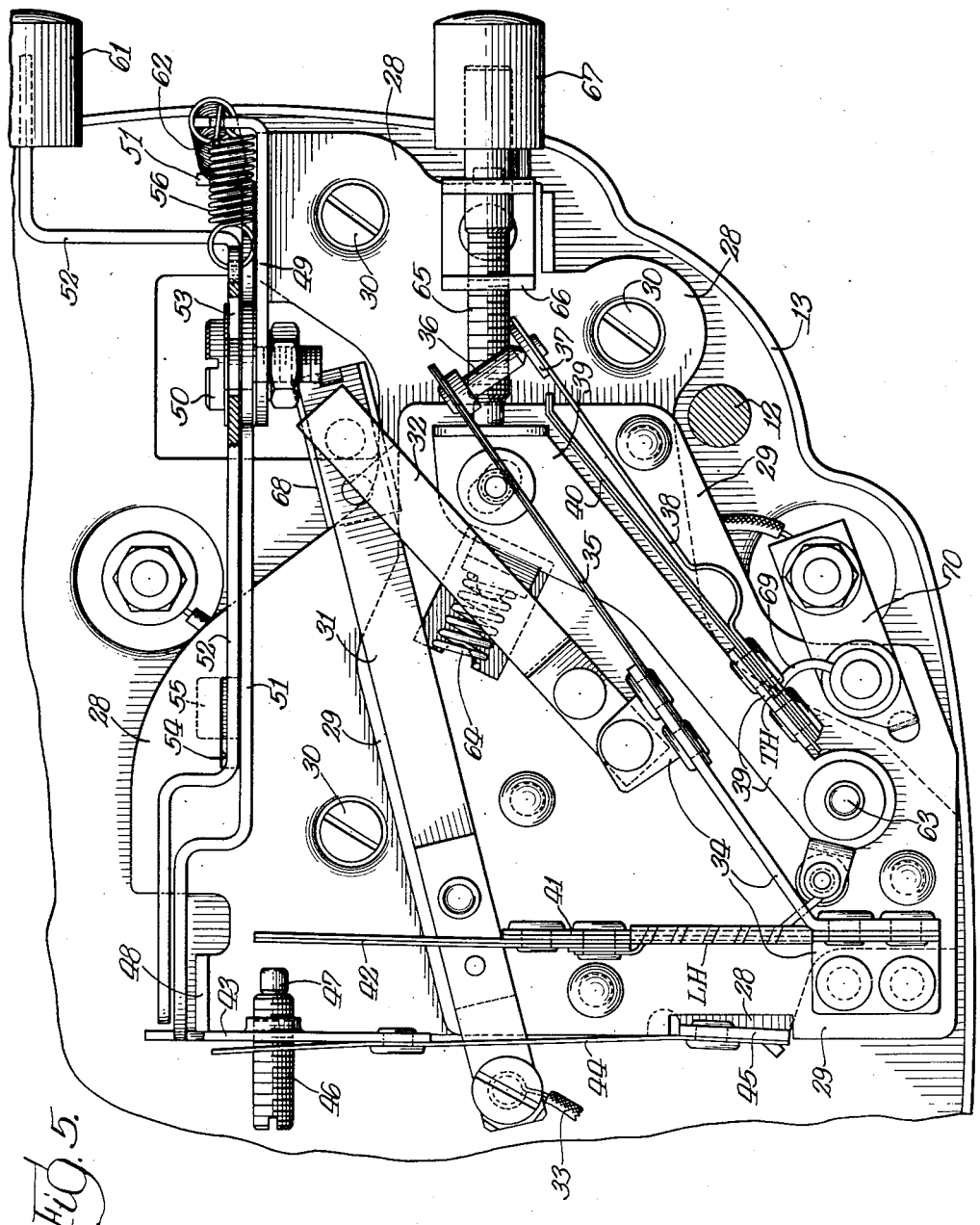
INVENTOR.
Alfred J. Huck,
BY Bair & Freeman
Attys.

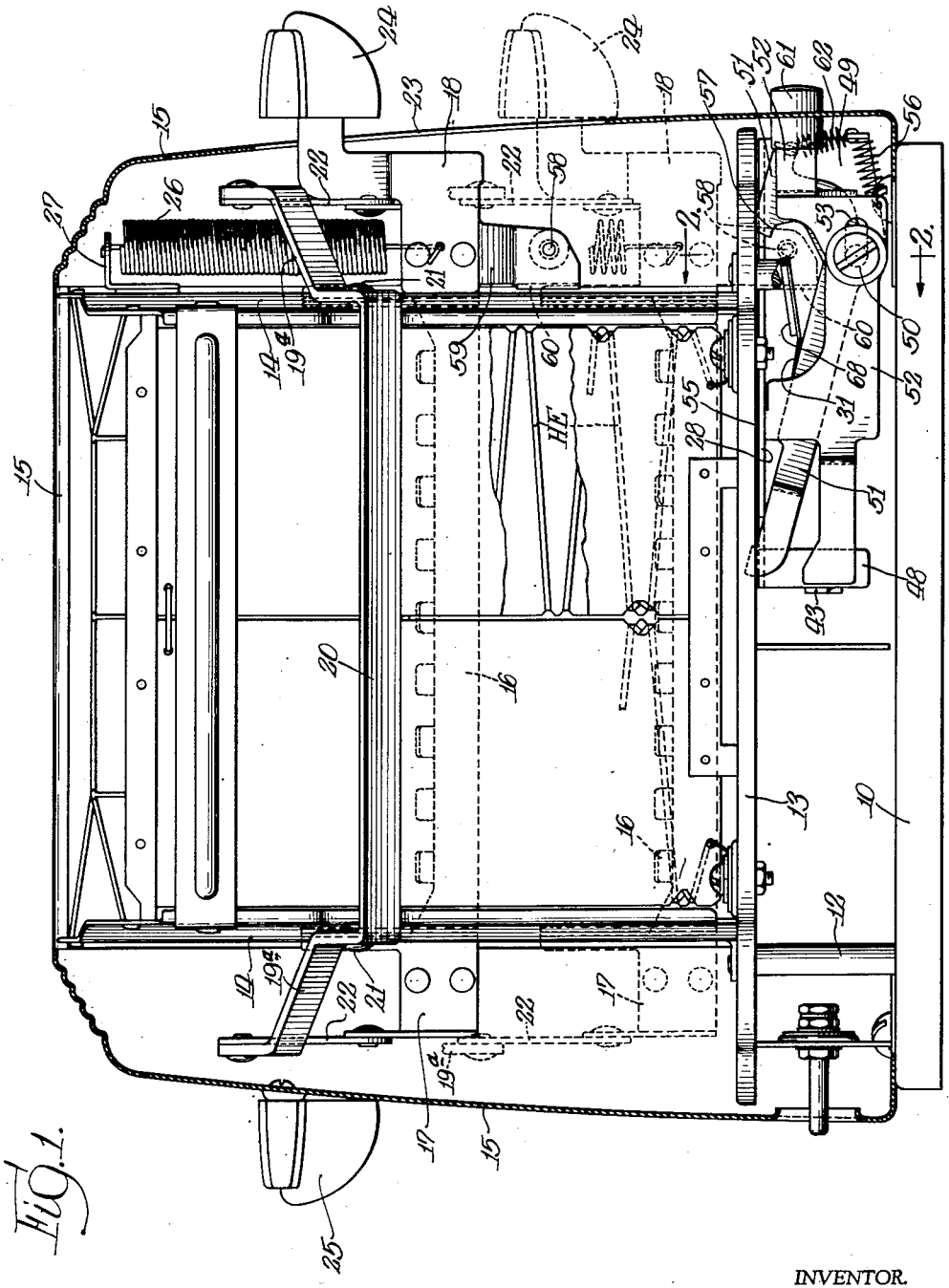

Patented Feb. 27, 1945

2,370,404

UNITED STATES PATENT OFFICE 2,370,404

TEMPERATURE RESPONSIVE CONTROL MECHANISM

Alfred J. Huck, St. Louis, Mo., assignor to Knapp-Monarch Company, St. Louis, Mo., a corporation of Missouri Application November 10, 1941, Serial No. 418,455

7 Claims. (Cl. 219—19)

My present invention relates to a temperature responsive control mechansim, and its general object is to provide mechanism of the character shown in Brosseau Patent No. 2,179,811, adapted for an oven type toaster as distinguished from one of the door type.

One object of the invention is to provide temperature responsive control means particularly suitable for use with appliances intended for use in successive operating cycles, the mechanism being comparatively simple and inexpensive to manufacture.

Another object is to provide an arrangement of elements in the temperature responsive control mechanism which prevent any possibility of recycling where the comparatively heavy current necessary for operation of an oven type toaster is to be controlled by the mechanism.

Still a further object is to provide a latch adjustment which eliminates any strain on the bimetal latch actuator in the normal position of the mechanism.

Still another object is to provide temperature responsive control mechanism which may be set by moving a vertically movable bread carrier downward to toasting position.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of a bread toaster with parts of the casing shown in section and showing my temperature responsive control mechanism applied thereto;

Figure 2 is an end elevation from the right of Figure 1, part of the figure being taken on the section line 2—2 of Figure 1;

Figure 3 is a view showing certain parts in the lower right-hand corner of Figure 1 in a different position;

Figure 4 is an electro-diagrammatic view showing the elements of my temperature responsive control mechanism in relation to the heating element of the toaster and the current supply; and Figure 5 is an enlarged bottom plan view of my temperature responsive control mechanism and a portion of the bottom of the toaster on which it is mounted.

On the accompanying drawings I have used the reference numeral 10 to indicate the base of an electrical appliance. A plurality of posts 12 extend upwardly therefrom to support an inner base plate 13. The inner base plate 13 forms a support for end plates 14 between which are mounted heating elements HE. The heating elements HE are of the usual type, comprising resistance ribbons suitably wound on sheets of mica or the like (being only partially shown in Figure 1).

A casing 15 is provided for the heating elements and end plates, such casing being shown in section in Figure 1, but being omitted from Figure 2. Within the casing 15 is a vertically slidable bread carrier 16. The bread carrier 16 has its end members 17 and 18 extended through slots 19 in the end plates 14. The slots guide the extensions 17 and 18 to keep the bread carrier 16 in properly aligned position. Ordinarily, three of the heating elements HE are provided with two of the bread carriers 16 arranged one between each outer heating element HE and the center heating element.

For raising and lowering both ends of the bread carrier 16 evenly, I provide a pair of crank arms 19ª formed on the ends of a bar 20. The bar 20 is pivoted at 21 and the arms 19ª are connected by links 22 with the extensions 17 and 18. The extension 18 passes through a slot 23 in one end of the casing 15, and has an operating handle 24 mounted thereon. Opposite the handle 24 a stationary handle 25 is mounted on the casing 15.

The bread carrier 16 is normally held in raised position by a spring 26 connected with the extension 18 and with a stationary bracket 27. The bread carrier 16 is moved downwardly by pressing down on the knob 24, thereby stretching the spring 26, as shown by dotted lines in Figure 1, the spring effecting return movement automatically, as will hereinafter appear.

My temperature responsive control mechanism, shown perhaps best in Figure 5, includes a base plate 28 having a supporting sheet of insulation 29 mounted thereon. The plate 28 is adapted to be secured, as by screws 30, to the inner base plate 13 of the toaster. A main switch, comprising leaf spring contacts 31 and 32, is mounted on the supporting sheet 29, the spring 31 being adapted for connection with a line wire 33, and the spring 32 being connected to a heat bridge bracket 34. Secured to the heat bridge 34 is a timer compensating element 35 of bimetal and carrying a contact 36. The contact 36 is normally engaged with a contact 37. The contact 37 is carried by a leaf spring 38 mounted on a bracket 39. The bracket 39 also carries a timer element 40 of bimetal, adapted at times to engage the leaf spring 38 to separate the contact 37 from the contact 36.

Carried by the bracket 34 is a bimetal element 41 constituting a latch actuator. Another bimetal element 42 is connected therewith, which constitutes a latch actuator compensator, as well as a means to operate a latch 43. The latch 43 is carried by a leaf spring 44 which, in turn, is carried by an ear 45 bent downwardly from the edge of the plate 28. A latch adjusting screw 46 is carried by the latch 43 and has an insulating button 47 to be engaged at times by the element 42. The leaf spring 44 serves also as a friction element to retain the adjustment of the screw 46 with relation to the latch 43.

The latch 43 is normally retained by the leaf spring 44 against a stop ear 48 extending downwardly from the plate 28. Another ear 49 is bent downwardly from the plate 28 and has a shouldered bolt 50 supported thereon. A bread carrier lock 51 is pivoted on the bolt 50, and a latch release bar 52 is slidable thereon by reason of a slot 53 of the bar coacting with the screw. The bar 52 also slidably coacts with a slot 54 of the plate 28, the bar having an ear extended therethrough and bent over, as indicated at 55, to retain the parts 28 and 52 in slidably assembled relation to each other. The latch release bar 52 is normally retracted to non-releasing position by a spring 56.

The bread carrier lock 51, as shown in Figures 1 and 3, has a hook at 57 which is adapted to hook over a pin 58 extending from a downward extension 59 of the bread carrier extension 18. In Figure 3 the bread carrier lock has been moved nearly to its locking position. Such movement is effected by an ear 60 of the extension 59 engaging the bread carrier lock 51 at a point to the left of the pivot 50, as shown in Figure 3, when the bread carrier is moved downwardly to carry the bread into position between the heating elements HE. Locking is effected by the left end of the lock 51 forcing the latch 43 outward, as shown, and finally permitting it to swing inwardly again to an obstructing position above the left end of the lock 51.

If it is now desired to release the bread carrier manually, the latch release bar 52 may be slid to the left against the bias of the spring 56 by engaging a knob 61 mounted thereon and projecting from the end of the toaster casing 15. This will force the latch 43 toward the left to release the left end of the lock 51, and a spring 62 will thereupon swing the lock to its original position. The hook 57 on the lock will accordingly release the pin 58, thereby permitting the spring 26 to lift the bread carrier.

I provide adjustment for my temperature responsive mechanism so that the timing period can be regulated as desired, to secure any color of toast. This is accomplished by pivotally mounting the bracket 39, as at 63, and forcing its opposite end, by means of a spring 64, against an adjusting screw 65. The adjusting screw 65 is threaded in a bracket 66 and terminates in an adjusting knob 67. Adjustment of the knob effects swinging of the leaf spring 38 to a more or less tensioned position.

At the same time that the bread carrier is lowered, it effects closure of the main switch 31—32 in the following described manner:

The ear 60 of the downward extension 59 engages an insulating plate 68 on the leaf spring 31 and forces the leaf spring downwardly until it engages the leaf spring 32. Reversely, when the bread carrier is unlocked so that it rises, it permits the leaf spring 31 to spring upwardly again to its initial position, thereby breaking the circuit.

The electric circuit from the line wire 33 can accordingly be traced through leaf springs 31 and 32 to the heat bridge bracket 34, and then through the bimetal element 35, the contacts 36 and 37 and the leaf spring 38 to the ear of the bracket 39 to which the bimetal 40 is secured. The current then passes through a single strip of resistance ribbon TH which constitutes a timing heater, and this ribbon, as indicated at 69, extends to a terminal 70. The terminal 70 is connected to one end of the heating element HE, as shown diagrammatically in Figure 4, and the other end of the heating element is connected with a line wire 71.

My control mechanism further includes a latch heater LH in the form of a resistance ribbon connected with the bracket 39 at one end and with the bimetal element 41 at the other end so that current through the latch heater LH will return through the bimetal element 41 to the heat bridge bracket 34 at certain times, as will hereinafter appear.

My present invention differs from that shown in the Brosseau patent in several respects. One difference resides in the use of the spring blade 38 to carry the current instead of having the bimetal element 40 do so. Accordingly, the operation is as follows:

When the toaster is set for operation and current is flowing from line wire 33 through elements 31, 32, 34, 35, 36, 37, 38, TH, 69, 70 and HE to 71, the heating element is in operation and the timing heater TH effects a gradual warping of the timing element 40 clockwise to eventually separate the contact 37 from the contact 36. Thereupon, the latch heater LH is introduced into the circuit as it was formerly shunted by the contacts 36 and 37. The current then flows from the heat bridge 34 through the bimetal element 41 and the latch heater LH to the bracket 39. The heat of the heater LH warps the latch actuator 41 counter-clockwise to engage the adjusting screw 46 and unlatch the latch 43 with respect to the bread carrier lock 51. The bimetal element 42 permits resetting of the toaster for the next toasting operation immediately, since it warps clockwise a delayed period of time after the latch actuator 41 warps counter-clockwise due to the flow of heat from 41 to 42, as described in the Brosseau patent. Also, in said patent the heat bridge bracket 34 carries heat from the heater LH to the bimetal element 35 which acts as a timer compensator, warping clockwise upon heat affecting it, both in response to heat across the heat bridge and a general rise of ambient temperature of the toaster. Since the current is carried in my mechanism across the spring 38 instead of through the timer element 40, the relatively heavy current necessary for an oven type toaster can be handled without danger of recycling, as in the Brosseau arrangement where separation of the contacts equivalent to my contacts 36 and 37, would cut out current flow through the timer element 40, thus permitting it to cool slightly, even though the timing heater TH is still in the circuit, and such cooling causes an undesirable recycling. With my arrangement, however, the current at no time passes through the timing element 40, and it is accordingly always responsive to only the timing heater TH and not to the full heating element current passing through the timer element itself.

Another feature adapting the present invention for better operation is the separation of the latch 43 from the latch actuating bimetal element 41 itself, so that normally it is spaced from the bimetal element 42 and places no strain on it or the bimetal element 41, regardless of at what position the adjusting screw 46 is placed. This is a factory adjustment, whereas color adjustment for the toast by the operator is secured by adjusting the knob 67.

My present invention has also adapted a control mechanism of this type to a toaster having a vertically movable bread carrier, the bread carrier, when moved downwardly, effecting closure of the main switch 31—32 and locking of the bread carrier in lowered position so that it may subsequently be released by the latch 43 at the end of the timing period to effect rise of the bread carrier and opening of the circuit through the toaster.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a toaster of the class described, a normally open main switch, means for manually closing said main switch, a latch for latching said main switch in closed position, and means for releasing said latch comprising a temperature responsive timer element, a timing heater therefor operable while said main switch is closed, a leaf spring, a contact carried by said leaf spring, said leaf spring being engageable by said timer element, a second contact engaging said first contact to by-pass current around said timer element, a second heater and a thermal motor actuated thereby for releasing said latch, said second heater being rendered operable by said contacts when they are disengaged as a result of temperature generated by said timing heater affecting said timer element.

2. In an electric appliance adapted to be operated in one or a plurality of successive cycles, a source of heat for heating said appliance, a casing disposed in proximity to said heat source so as to be heated thereby, and control means located in said casing comprising a control element and a delay-action thermal motor for operating said control element in each cycle to control said heat source, manually operable means for adjusting the position of said control element with relation to said thermal motor to determine the action thereof in the initial operating cycle of the appliance, a heater for said thermal motor to operate the thermal motor only at the completion of an operating cycle of the appliance, contacts for controlling said heater, a timer element, a leaf spring carrying one of said contacts and engageable by said timer element at the end of the timing period, and a timer heater for said timer element, said timer heater effecting movement of said timer element to position for engaging said leaf spring to cause said contacts to assume a position rendering said first heater operable and said leaf spring effecting by-passage of the current with respect to said timer element when said contacts are engaged.

3. In an electrical appliance having an electrically operated element and an energizing circuit for the element, a main switch for closing the circuit to energize the element, latch means for holding said switch in circuit-closing position and temperature responsive timing means for actuating said latch, means comprising a delay-action thermal motor adapted to move the latch means out of holding position and a thermal element adapted to move the latch means toward holding position to compensate for the overrun of said thermal motor, a heater for said temperature responsive timing means, and a thermal timer to operate said heating means, said thermal timer being responsive to only the heat of said heater and ambient toaster temperature.

4. In an electric appliance adapted to be operated in one or a plurality of successive cycles, a source of heat for heating said appliance, a casing disposed in proximity to said heat source so as to be heated thereby, and control means located in said casing comprising a thermal motor operated in each cycle to control said heat source, means for automatically modifying the action of said thermal motor in successive operations of the appliance to compensate for variations in the temperature of said casing, said last means including a heater for said thermal motor, said motor being arranged relative to said heater so that the heat of the heater effects operation of the motor only after the completion of an operating cycle of the appliance, a timer element, a timer heater therefor, said timer element being responsive to said timer heater and to ambient appliance temperature only, and means whereby said timer heater effects movement of said timer element to position for energizing said first heater.

5. In a toaster adapted to be operated at intervals in quick succession, a bread carrier, a control switch for the toaster, said bread carrier being operable to close said control switch, and timing means for opening said control switch comprising a delay-action thermal motor bendable in one direction for opening the switch, a heater for operating said thermal motor, and energizing means for said heater, said energizing means comprising a thermal timer including a bimetal timing element and a leaf spring, contacts for controlling said heater with the current passing through said spring and by passing said timing element, said timing element being engageable at the end of the timing period with said spring to operate said contacts.

6. In an electrical toaster having an electrically operated heating element and an energizing circuit for the heating element, a bread carrier, a main switch for closing the circuit to energize the heating element when the bread carrier is moved to toasting position, latch means for holding said switch in circuit-closing position, and temperature responsive timing means for actuating said latch means comprising a thermal motor adapted to move the latch means out of holding position, a heater for said thermal motor, a thermal timer to operate said heater, and a second heater for said thermal timer in circuit with said main switch, said thermal timer being responsive to only the ambient toaster temperature and heat of said second heater to thereby continue in first heater energizing position after reaching such position and until said first heater effects movement of said thermal motor to position releasing said latch and thereby opening said main switch to deenergize said second heater.

7. In a toaster of the class described, a vertically movable bread carrier, a normally open switch, a spring retaining said bread carrier in raised position, said bread carrier being manually lowerable for closing said switch, a lock element for said bread carrier having a hook to engage the bread carrier when in lowered position, a latch for latching said lock element, and means for releasing said latch comprising a temperature responsive timer element, a heater therefor operable while said switch is closed, a leaf spring adjacent said timer element, a contact carried thereby, a second contact normally engaged with said first contact and separable therefrom upon a predetermined temperature affecting said timer element, a second heater and a thermal motor actuated thereby for releasing said latch, said second heater being rendered operable by said contacts while disengaged.

ALFRED J. HUCK.